US008464937B2

(12) United States Patent
Reed et al.

(10) Patent No.: US 8,464,937 B2
(45) Date of Patent: *Jun. 18, 2013

(54) ACCOUNT CONTROL METHOD AND SYSTEM THAT ALLOWS ONLY ELIGIBLE AND AUTHORIZED ITEMS TO BE PURCHASED USING THE ACCOUNT

(75) Inventors: Cullen L. Reed, Louisville, KY (US); Richard L. Stephenson, Louisville, KY (US); Steven T. Brown, Franklin, WI (US); Joanne E. Gruchalski, Franklin, WI (US); Henry A. Widenski, Jr., Pewaukee, WI (US); Jeffrey Jay Erdmann, Richfield, WI (US)

(73) Assignees: Alegeus Technologies, LLC, Waltham, MA (US); Humana, Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/004,827

(22) Filed: Jan. 11, 2011

(65) Prior Publication Data

US 2011/0173083 A1 Jul. 14, 2011

Related U.S. Application Data

(63) Continuation of application No. 11/285,053, filed on Nov. 22, 2005, now Pat. No. 7,866,548.

(60) Provisional application No. 60/632,332, filed on Dec. 1, 2004.

(51) Int. Cl.
*G06K 5/00* (2006.01)
(52) U.S. Cl.
USPC ............................ 235/380; 235/381; 235/379
(58) Field of Classification Search
USPC .......................................... 235/379–381, 383
See application file for complete search history.

(56) References Cited

U.S. PATENT DOCUMENTS

| 6,047,267 A * | 4/2000 | Owens et al. ................... 705/34 |
| 7,707,110 B2 * | 4/2010 | Randall et al. .................. 705/40 |
| 2006/0190337 A1 * | 8/2006 | Ayers et al. ..................... 705/14 |

* cited by examiner

*Primary Examiner* — Thien M Le
*Assistant Examiner* — Sonji Johnson

(57) ABSTRACT

The present invention relates to a real time account control method and system that allows only eligible and authorized items to be purchased using the account. The present invention relates particularly to healthcare spending accounts such as flexible spending accounts and health reimbursement arrangements. The method can comprise the steps of: establishing at least one account, each account having an account holder; identifying at least one item eligible for purchase using one of the accounts; identifying at least one item authorized for purchase using one of the accounts; and, upon request to purchase an item using one of the accounts, authorizing the purchase for an amount not to exceed an available balance in that account only if the item is both an item identified as eligible for purchase and an item authorized for purchase.

17 Claims, 2 Drawing Sheets

ACCOUNT CONTROL METHOD AND SYSTEM THAT ALLOWS ONLY ELIGIBLE AND AUTHORIZED ITEMS TO BE PURCHASED USING THE ACCOUNT

This application is a continuation of U.S. patent application Ser. No. 11/285,053, filed on Nov. 22, 2005, now U.S. Pat. No. 7,866,548, which claims the benefit of U.S. Provisional Patent Application Ser. No. 60/632,332, filed on Dec. 1, 2004, the entire contents of which are incorporated herein by reference.

BACKGROUND OF THE INVENTION

Field of the Invention

The present invention relates to a real time account control method and system that allows only eligible and authorized items to be purchased using the account. While having applicability to debit, or similar type, accounts generally, the method and system are explained as used in the healthcare environment. There, funds available in an account, for example, a flexible spending account (FSA) or a health reimbursement arrangement (HRA), are accessed to pay for over the counter (OTC) medications or any other eligible goods and services. More specifically, the invention enables a consumer of medical service and products to access funds available in an FSA or HRA healthcare spending account using, for example, a debit/credit card and pay for only eligible and authorized goods and services, such as over the counter medications at a pharmacy or other point of sale, without the necessity of obtaining and submitting a receipt either before or after the disbursement (or reimbursement) of funds. The method and system can be used by consumers at actual stores, at virtual stores (Internet purchases), and for mail order or phone order purchases.

SUMMARY OF THE INVENTION

Real time account control that allows only eligible and authorized items to be purchased using the account is desirable. For example, instead of giving away items, a charitable, government, or other organization may prefer to give away a debit card that may be used to purchase only certain items. For example, in the recent hurricane disasters, organizations gave individuals in need debit cards having an amount of money in the account associated with the debit card. Those debit cards were to ideally have been used to purchase food, medicine, lodging, and other items and services that were necessary to allow the individual in need to get back on their feet. Had the debit card account been controlled to only permit the purchase of certain items or types of items, then the accounts could not have been used to purchase jewelry and other non-essential items. By identifying eligible items at the store level by category or department, or even at the individual item level, and by identifying items authorized for purchase at the item or category level by the person or entity giving out the card, and by setting up the system described herein, the cards could be restricted to only purchase eligible and authorized items.

The above situation mainly applies in a debit card situation. However, real time account control that allows only eligible and authorized items to be purchased using the account is desirable in either a debit or credit situation. For example, debit or credit accounts could be established for individuals desiring to go on a specific diet. A merchant, such as a grocer, could identify eligible diet items based on item categories or based on the specific dietary characteristics of the individual items. Then, different account types could be set up for different diets. For example, there could be an Atkins diet account type and a South Beach diet account type. For each different account type, different categories or items would be authorized for purchase using the account. When a customer takes the items for check-out, only those items that are eligible and authorized by the customer's specific diet account can be purchased using the credit or debit account. For this transaction, the point of sale system communicates information about the eligible items and the specific diet account to a transaction processor. The transaction processor determines which of the eligible items are authorized for purchase using the specific diet account and communicates this information back to the point of sale system. Then, the purchase using the specific diet account is completed using a standard financial card network. If the customer has additional not eligible and/or not authorized items, then alternate payment means, such as, for example, cash, check, other credit card, other debit card, must be presented to pay for those items.

A similar situation applies in the healthcare area where individuals have accounts which are to be used to purchase only eligible goods and services. In fact, there are government requirements that purchases from these healthcare accounts be substantiated to confirm that only eligible items are in fact purchased. The present invention permits this substantiation to be accomplished in real time before the account is debited rather than after the fact.

Flexible Spending Accounts (FSAs) are authorized by Internal Revenue Service (IRS) Code Section 125. FSAs are pretax accounts, established by plan sponsors such as employers, and generally funded by an employee and used to purchase allowable medical expenses. Furthermore, the Internal Revenue Service regulations permit individual participants in certain health insurance plans to place pre-tax earnings in the flexible spending account, which funds may be utilized to purchase certain pre-approved medically related goods and services. The employee sees economic benefit from using these accounts since they may be funded from the employee's pre-tax earnings. Unused funds remaining in an FSA at the end of a plan year (for a given health care insurance plan) are forfeited to the employer/plan sponsor.

Assuming that an employee decides to put $50 per pay period into an FSA and assuming that there are 26 pay periods, the employee will put $1,300 for the year into the FSA. It is noted that the employee has access to the entire $1,300 from the start of the plan year and the employer/plan sponsor is obligated to advance all $1,300 if the employee wants to expend it at the start of the plan year. Assuming that there are 100 employees in a plan and each contributes the same $50 per pay period, the plan sponsor does not fully fund all 100 employee FSA's at the start of the year. Typically, the plan sponsor has an agreement with a third party administrator (TPA), such as a bank or financial institution, who establishes the individual employee accounts and issues the debit cards. The plan sponsor and TPA then agree as to a pool of money that the plan sponsor provides to the TPA to cover expected expenditures by the 100 plan members. That dollar amount is typically much less than $1,300 times 100 or $130,000. As the employee plan members use their accounts, their individual expenditures are paid out from this pool. As the pool is exhausted, the TPA generally has the plan sponsor add additional funds to the pool. Each of the 100 employees has an "available balance" which, assuming the above number and no expenditures, is $1,300 at the start of the year. This available balance decreases as each employee uses their account. However, these employee FSAs are not individually funded.

Recently, the IRS has modified its regulations to permit the purchase of over the counter medications (OTCs) using the funds deposited in a flexible spending account, provided that the account holder substantiate that 100% of the transactions paid for through FSAs are for "eligible" expenses.

Health Reimbursement Arrangements (HRAs), which are also known in the art as Personal Care Accounts (PCAs), are similar to FSAs in that they are also commonly used to purchase allowable medical expenses. One distinction of HRAs is that they are funded by the employer/plan sponsor rather than the employee. Another distinction is that the unused funds in a HRA account at the end of the plan year can be transferred to the HRA in the following plan year so long as the employee elects to use this type of benefit with the same employer in that following year. Therefore, with an HRA, insured employees and their covered dependents do not have a financial incentive to use all the HRA funds in a given plan year, as they are not "use or lose" funds as are FSA funds.

In general, employees who elect to subscribe to or utilize FSA and HRA accounts may purchase allowable medical services or products using their regular after-tax wages. These employee subscribers then submit claim forms along with a receipt of the purchase transaction to their FSA/HRA administrator, typically the TPA mentioned earlier, to request reimbursement from their healthcare spending account(s). Where a plan sponsor offers employees multiple accounts, it is the plan sponsor who controls the plan order of reimbursement. If the employee subscriber has both an FSA and a HRA, the employee would generally prefer reimbursement from their FSA until it has a zero balance and subsequently reimbursement from their HRA. This permits the employee to have a greater chance of having remaining money in their HRA at the end of a plan year which can be rolled over into a HRA the following year.

After submission of the claim and receipt to the administrator, the administrator then checks the purchase receipt to ensure the transaction expense is authorized for reimbursement and then pays the subscriber out of their healthcare spending account or accounts, as appropriate. This process is a manual and time consuming process, requiring labor from the administrator and requiring the employee to pay for their benefits and then wait for reimbursement of the expense.

One alternative to the reimbursement approach outlined above is the use of a debit/credit card that is used at the point of sale to purchase the eligible service or product. The debit/credit card is linked to the healthcare spending account of the insured employee. As one example of this reimbursement scheme, an insured health plan subscriber could visit their doctor and pay for the visit using a debit card. Like any debit card transaction the subscriber would typically swipe their debit card through a card reader at the point of sale (POS) system for the amount of the sale. A known in the art financial credit card network would then check the subscriber's account available balance and transmit a message to the point of sale system that the transaction was authorized.

One difficulty with this process is that it does not substantiate that the purchase was an allowable medical expense according to IRS guidelines. Accordingly, the administrator must then request a receipt from the insured after the fact to substantiate the transaction. This transaction creates a poor customer experience if the insured subscriber cannot find a particular transaction receipt. It also forces the plan sponsor to collect any erroneously disbursed funds from the subscriber if the transaction was for an ineligible expense.

The above referenced reimbursement process is also used to purchase prescriptions from pharmacies. In this situation, the insured subscriber provides their insurance information to a pharmacist who then runs the claim transaction through a "real-time" pharmacy benefit manager (PBM) system, for example, the Caremark® system. The Caremark® system pre-adjudicates the prescription submitted and alerts the pharmacist how much to charge the subscriber for filling the prescription. At the same time, the PBM transmits transaction detail to the transaction processor. The subscriber then swipes for the approved amount at the POS system and the transaction processor approves the transaction based on the availability of the funds for the transaction in the subscriber's healthcare spending account and the existence of the transmitted transaction detail at the transaction processor. In this situation, the transaction is substantiated since the amount swiped equals the amount transmitted.

More particularly, the present invention is for a method for account control, comprising the following steps: establishing at least one account, each account having an account holder; identifying at least one item eligible for purchase using one of the at least one account; identifying at least one item authorized for purchase using one of the at least one account; and, upon request to purchase an item using one of the at least one account, authorizing the purchase for an amount not to exceed an available balance in one of the at least one account only if the item is both an item identified as eligible for purchase and an item authorized for purchase. In this method, the step of identifying at least one item authorized for purchase can include identification by category and/or the step of identifying at least one item eligible for purchase can include identification by category. Also, in this method, the step of establishing at least one account is accomplished by an account administrator; the step of identifying at least one item eligible for purchase is accomplished by a merchant; the step of identifying at least one item authorized for purchase is accomplished by a plan sponsor; and the step of authorizing the purchase is accomplished by a transaction processor.

Directed to a healthcare spending account, the method for real-time access to funds available in at least one healthcare spending account, can comprise the following steps: authorizing merchant categories for healthcare spending account reimbursement; classifying items by their eligibility for reimbursement by the merchant and identifying merchant categories for each item; presenting items for purchase at a merchant point of sale (POS) system; presenting a healthcare spending account device at a merchant POS system, the healthcare spending account device identifying at least one healthcare spending account; recognizing the eligible healthcare spending account items by the POS system; sending healthcare spending account item transaction data to a decision system by the merchant; substantiating at the decision system which eligible healthcare spending account items are authorized; determining if the at least one healthcare spending account identified by the healthcare spending account device has an available balance; sending a response record with a preauthorized transaction amount from the decision system to the merchant for financial processing, the transaction amount not to exceed the available balance for the at least one healthcare spending account; sending a transaction request that is based on the decision system response record through a financial card network to the transaction processor by the merchant; authorizing, in real-time, healthcare spending account amounts by the transaction processor for the preauthorized transaction amount from the response record; calculating any balance due in excess of the authorized healthcare spending account amounts for the items presented; and, requesting payment of any balance due by the merchant. For this method, the at least one healthcare spending account can include a flexible spending account and/or a health reimbursement arrangement. The step of authorizing merchant categories can be provided by one of a plan sponsor, an insurance company, or another applicable party. The items can be recognized by universal product codes. The healthcare spending account device can be a debit card. The decision system can be located at the transaction processor. The items may comprise any of co-payment costs, product costs, service costs, and pharmacy refill costs. Further, non-medical items can be purchased, but not reimbursed, in addition to the medical items. This is sometimes referred to as a "split transaction."

The system for providing real-time access to funds available in at least one healthcare spending account, can comprise: a. a point of sale system configured to recognize and support real-time transactions involving the at least one healthcare spending account, the point of sale system including: (1.) a first input device capable of recognizing items presented for purchase; (2.) a second input device capable of recognizing a healthcare spending account device identifying the at least one healthcare spending account; (3.) a processor system in communication with the first and the second input devices; b. a transaction processor system including: (1.) a first data structure configured to contain eligible item identifiers for items that are eligible for purchase using the at least one healthcare spending account; (2.) a second data structure configured to contain authorized item identifiers for items that are authorized for purchase using the at least one healthcare spending account; (3.) a third data structure configured to contain transaction data detail; (4.) a decision system using the eligible item identifiers contained in the first data structure, the authorized item identifiers contained in the second data structure, and the transaction data detail contained in the third data structure to process transactions and provide transaction information to the point of sale system; c. a first data communications network connecting the point of sale system and the transaction processor system to a financial card network; and, d. a second data communications network connecting the point of sale system and the transaction processor system. The two data communications networks are used due to current bandwidth limitations. However, if bandwidth constraints are overcome, the system could include at least one data communications network configured to provide communication between the point of sale system, the transaction processor system, and a financial card network In this system, the transactions can be over the counter transactions. The first input device can be a universal product code scanning device system and the second input device can be a card reader device. The healthcare spending account device can be a debit card. Wireless network interface technology can be employed by the system and the wireless network interface technology can be configured to communicate via WiFi or IEEE 802.11 standards. The transaction processor system information can be made available by the point of sale system using at least one output screen which can prompt for responses. In that case, at least a portion of the input into the input devices can be required on the at least one output screen. Even further, data encryption technology can be employed by the system.

DETAILED DESCRIPTION OF THE PREFERRED EMBODIMENT

Figure 1:
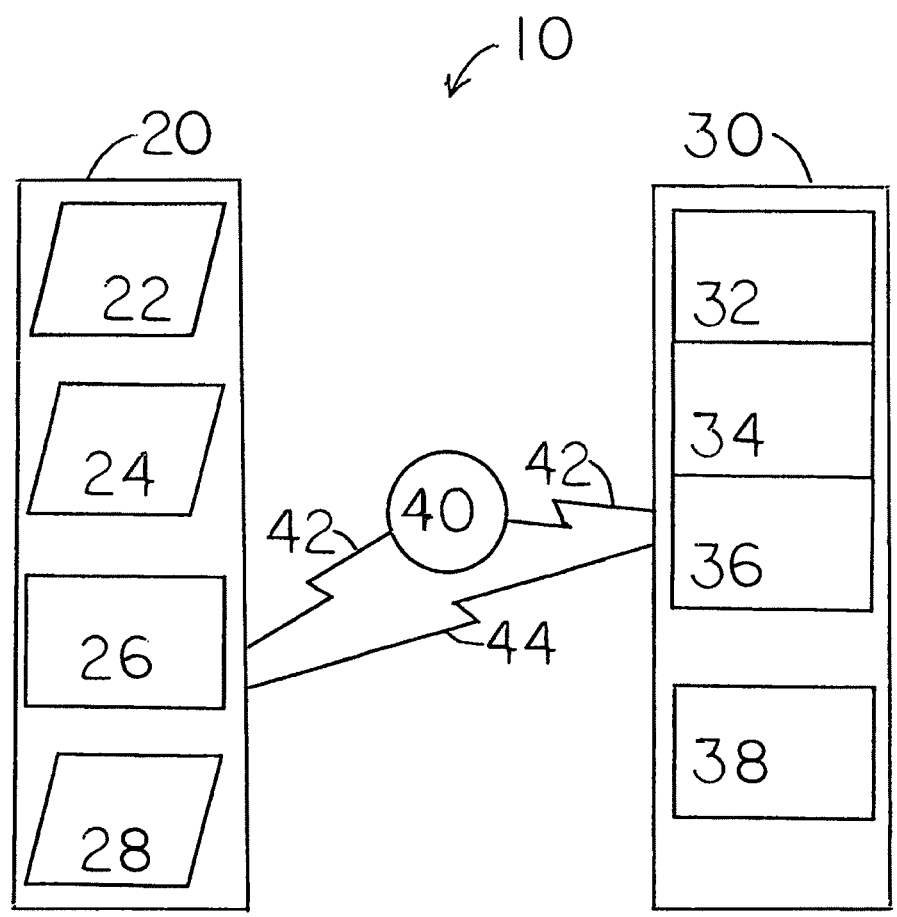
FIG. 1 is a system diagram for the account control system of the present invention.

The present invention relates to a real time account control method and system that allows only eligible and authorized items to be purchased using the account.

One difficulty arising from the promulgation of the new IRS regulations pertaining to the purchase of over the counter medications with funds from healthcare spending accounts is determining which expenses are eligible to be paid through an FSA/HRA, and which expenses must be paid by the plan participant out-of-pocket. The present invention obviates this difficulty by providing a system and method for authorizing FSA/HRA eligible over the counter items in "real-time" at the point of sale and automatically substantiating those items as eligible under the regulatory guidelines of the IRS.

The system further provides a method of checking whether an item paid for by a debit/credit card linked to an FSA/HRA at the point of sale is authorized for purchase under the aforementioned regulations and substantiating the purchase at the time the customer uses the card to consummate the transaction at the point of sale. This authorization and substantiation process is a transaction between the retailer and card processor, and utilizes a number of transaction clearance systems that are already in commercial use. The present invention eliminates the requirement that plan participants submit paper receipts to their insurance carrier to comply with the IRS substantiation requirement. Additionally, this system could logically be extended to Health Savings Accounts (HSAs). Hereinafter, FSA or healthcare spending account will be used to refer to all types of these healthcare spending accounts unless specifically noted.

While the system and method of the present invention can be utilized in a variety of situations, for example the charitable debit cards explained earlier, the system and method will be described in detail as related specifically to the purchase of OTC medications and remedies using the debit/credit card approach. As one example of the system of the invention, a pharmacy (or other merchant) cashier scans all the subscriber's purchase items utilizing a conventional commercially available bar-code scanner and an associated computer system for scanning standard UPC (universal product code) bar code labels, and then requests payment. Bar code scanners and associated computer systems for use by merchants are widely commercially available, and well known to one of ordinary skill in the art. The subscriber then swipes the debit/credit card at the POS system (also included as a peripheral device in the computer system) wherein the computer system first recognizes the BIN (Bank Identification Number) included on the card thereby initiating the electronic transmission of UPC data to a designated card processor such as Metavante®, First Data®, or NPC® for substantiation of eligible expenses. For ease of explanation, the term "subscriber" denotes the insured party/consumer/ employee/plan participant/account holder, and those of ordinary skill in the art will recognize that various terms may be used therefor.

Since many conventional financial networks (i.e. VISA® or MasterCard®) do not currently have sufficient bandwidth to receive a UPC for each item included in a transaction, with the instant invention, the card or transaction processor system and the merchant point of sale system communicate twice about each transaction. The initial data transmission between the retailer and the card processor determine what eligible items are authorized for purchase. This communication requires the merchant and card processor to install a separate designated data communication network line (for example a T-1 line, cable modem, or other commercially available data communication link) between the merchant's computer system and the transaction processor's system. The second communication completes the financial transaction using conventional financial networks to settle the purchase. However, should the current bandwidth limitations be overcome, only a single data communications data network line may suffice.

FIG. 1 shows a diagram of the system 10 of the present invention. The system 10 employs a merchant point of sale system 20 and a transaction processor system 30 and the two data communications networks that interconnect them. The first data communications network 42 may, for example, be the connectivity through a financial card network 40 and the second data communications network 44 may, for example, be the T-1 line described above directly connecting the merchant and transaction processor.

The merchant's point of sale system 20 preferably includes a first input device 22, for example, a bar code scanner for scanning item UPCs, and a second input device 24, for example, a card reader device for reading the information contained on a debit/credit card. However, one input device may be all that is necessary. For example, a debit/credit card which requires a card reader could be replaced with a device with a bar code which could be scanned by the same input device which scans the items to be purchased. Also, rfid, or radio frequency identification, tag technology is being employed more and more. Through EPC Global Inc. and other organizations, rfid standards and technology are being developed which should permit rfid tags in items to provide item identification information as bar codes do currently. For this invention, any input device or devices can be used so long as they can provide sufficient identification information about the items and the account to the point of sale system.

While the present embodiment is being described for a merchant/customer or seller/buyer encounter, as was explained earlier, this system could be employed in a virtual encounter situation, for example, over the Internet or in a phone order situation. In the virtual encounter situation, the customer may directly enter required transaction information using one or more input devices, for example, keyboard, keypad, mouse, or card reader. In a phone order situation, the customer provides required transaction information to a person or computer over a phone. In these situations, the first 22 and second 24 input devices may be the same device or separate devices.

The point of sale system 20 further includes a processor system 26 and may also include an output device, such as, for example, output screen 28. The processor system 26 may include a single processor or multiple processors. In a typical merchant environment, at the cash register where the customer presents the items for check-out, the cash register is a "smart" terminal which includes a processor. This cash register is also typically connected to a merchant "back room" processor. It is that back room processor or processors that may maintain merchant inventories as items are scanned for purchase or received and placed on the shelves for sale. These cash register terminals and back room processors are well known in the industry. Output screen 28 is typically used to keep the customer informed by, for example, identifying the items to be purchased and their price and other information about the transaction, such as, for example, the amount due from the customer for the transaction, and information about what amounts are authorized for eligible items under the customer's healthcare spending account.

The transaction processor system 30 includes a first data structure 32 configured to contain eligible item identifiers. As is explained in more detail with the method description, the merchant will preferably detail each item by UPC, the merchant's department or category for the item, and whether or not the item is an eligible item. In some situations, identification of the department or category for each item may sufficiently identify an item as eligible. In other situations eligibility identification may be at the individual item level. However, depending on how different merchants define their departments, individual item eligibility identification may be required. The merchant transmits these eligible item identifiers to the transaction processor to include this information in the first data structure 32.

The transaction processor system 30 also includes a second data structure 34 which is configured to contain authorized item identifiers. As is explained in more detail below, in the healthcare spending account situation, an insurance company will work hand-in-hand with a plan sponsor, for example, an employer, to offer one or more healthcare spending accounts to employees. Those participating are typically referred to as plan participants, plan subscribers, or account holders. In this situation, the plan sponsor may wish to limit the items that the plan participants can purchase under the plan. The insurer may group items by departments or categories in the same way that a merchant does and then the plan sponsor, instead of choosing to authorize all eligible items for purchase, could choose to offer one or more groups under the healthcare spending account plan. Further, instead of department groupings, the insurer and plan sponsor could, for example, select subsets of departments or even individual items. These items, subsets of departments, departments, or groups of departments selected by the plan sponsor to be offered under the plan are referred to as "authorized" items.

The transaction processor system 30 also includes a third data structure configured to contain transaction data detail.

Typically, the insurer and the plan sponsor do not "administer" the plan day-to-day. Usually, this function is handled by a third party administrator, or TPA. The TPA is usually a financial institution who establishes accounts for the plan participants and issues the debit/credit cards to the account holders. This TPA communicates with the transaction processor and works closely with the plan sponsor as, with most healthcare spending accounts, the plan sponsor is responsible to ensure that the plan operates in accordance with government rules and regulations.

The transaction processor system 30 also includes a decision processor 38. It is this decision processor 38 that receives transaction data from the point of sale system 20, initially over the second data network 44, the transaction data typically including information on each eligible item, such as, for example, the UPC and price, and the healthcare spending account detail. The transaction processor system 30 compares the eligible items to the authorized items and transmits transaction data back to the point of sale system 20 to identify the cost for the eligible and authorized items. This, and the rest of the transaction, is explained in more detail below with the discussion of the method.

Before the method for account control is explained for a plan participant purchasing items at a merchant's using a healthcare savings account, the "upfront" work by, for example, the insurer, plan sponsor, third party administrator, merchant, and transaction processor to get the system ready for use by a plan participant is discussed.

System Setup Processes

Two processes are necessary to set up the substantiation system—the UPC maintenance feed process and the data storage process. The UPC maintenance feed process ensures that the transaction processors and merchants UPC item records are synchronized with each other. The merchant typically makes thousands of changes to their point of sale systems computer processing systems each month. These changes include updated UPC information required due to different or new product offerings, changes in product size, quantity, and price. When the merchant effects UPC modifications, it electronically transmits those UPC updates, including product descriptions, to a designated transaction processor. The transaction processor then stores the UPC information along with associated product descriptions in a database, for example, the first data structure 32 discussed above.

For example, a merchant may transmit department or category records and item records to the transaction processor. Each department record will typically include a short department identifier, a description of the department identifier, and may include an identification as to whether or not items in this department are usually FSA eligible under the federal rules and regulations mentioned above. Each item record will typically include the UPC code for the item, an identification by short department identifier of the department to which the item is defined, a long description of the item, a short description of the item as it would appear on the receipt, an indication of whether or not the item is FSA eligible, and an indication as to whether or not the item is a retailer brand item.

The data storage process is executed by the transaction processor system to preferably store, for example in the third data structure 36, the following data fields associated with each individual transaction: subscriber identification number (insured identification number), debit/credit card number, all eligible UPCs purchased, the dollar amounts of each item, merchant identification, approved amount per transaction, date and time of each transaction, and a unique transaction identification number. Periodically, all transactions and their associated data from each card processor are transmitted to the plan administrator and/or insurance carrier for further processing, further transmission, and/or storage.

Optionally, the insurance carrier may set up a plurality of product groupings that correspond to various merchant product departments, for ease of product tracking and reference. Various products are assigned, along with their UPCs to one of the product groupings, whereupon the groupings and their associated products are transmitted to the transaction processor so that the processor can readily access a merchant and insurer specific product and its associated UPC. Furthermore, the aforementioned product groupings may vary by insurance plan, such that different plan sponsors/employers may permit different products to be covered by the offered FSA. Employers may choose any of the product groupings upon a new group setup after a sale, upon renewal each year or any other time an insurer elects to give employers the option.

For example, a merchant could have the following departments or categories: diet aids, antacids, cough/cold, pain/sleep, acne, allergy, and diagnostics. From these, three groups could be set-up by the insurer. For example, group one could be cough/cold, pain/sleep, and antacids; group two could be pain/sleep and diagnostics; and group three could be acne, allergy, and over the counter prescriptions, and miscellaneous items. The plan sponsor could then select to offer one, two, or all three groups to the plan participants. After the plan sponsor selects what the plan will offer, the insurer typically electronically communicates these selections, by plan, to the transaction processor. The transaction processor stores this authorized item information in, for example, a second data structure 34, for use in processing subsequent transactions to confirm that, by plan, only items eligible and authorized are purchased by a plan participant using that participant's healthcare spending account.

Point of Sale Transaction Process

Figure 2:
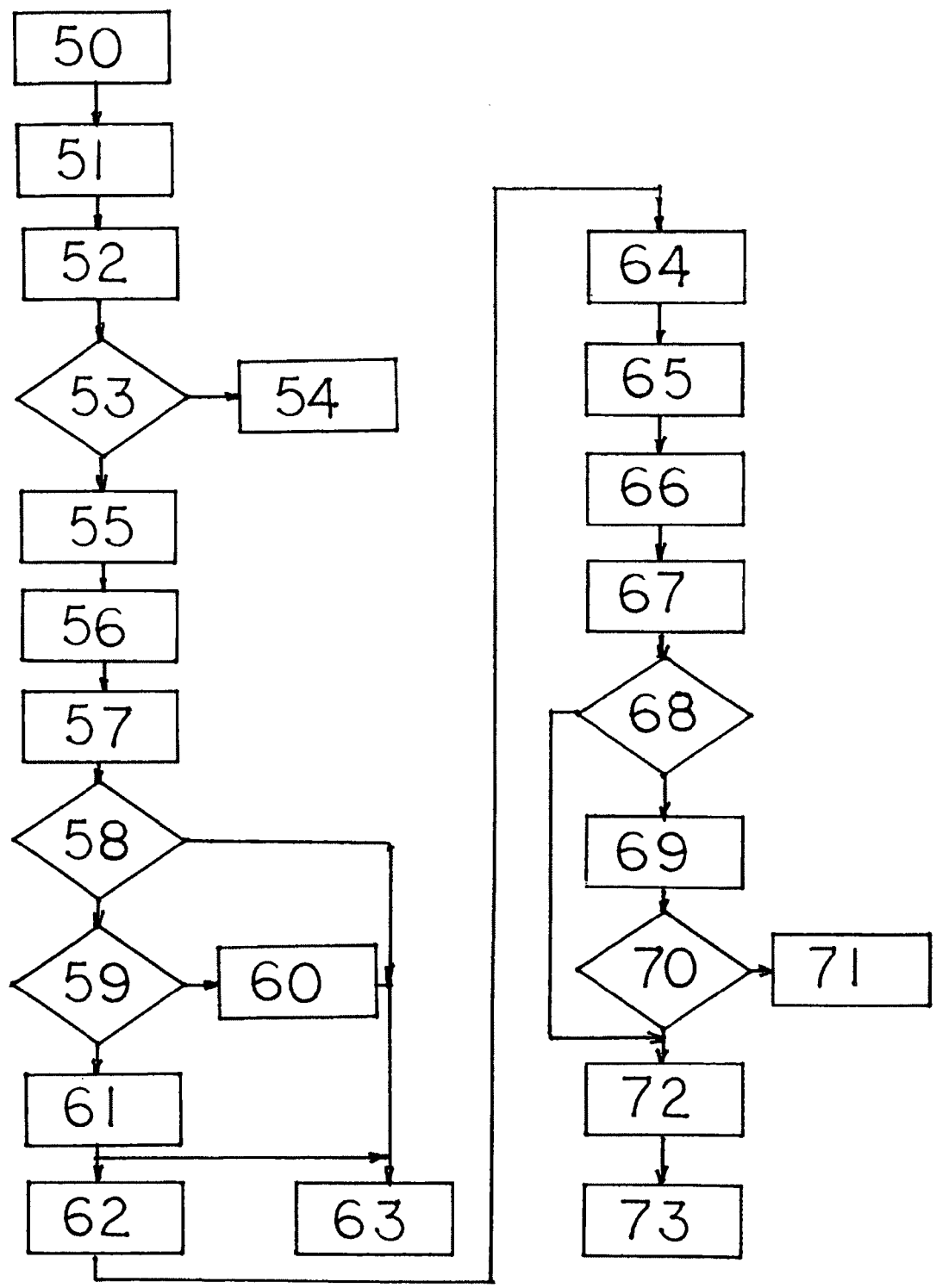
FIG. 2 is a process flow diagram in accordance with an embodiment of the present invention.

Referring now to FIG. 2, and in accordance with the instant invention, the point of sale transaction process flow is shown. The method shown provides a healthcare spending account subscriber with the ability to purchase over the counter medications and remedies without having to submit cumbersome claim forms and receipts subsequent to the purchase.

Initially, a pharmacy or other merchant typically scans the UPC of all items a customer has selected for purchase, item 50. The cashier requests payment for the items, whereupon the customer may present and swipe their debit card or credit card at the POS system, item 51. For purposes of the instant invention, a debit card is a standard debit card with the typical magnetically encoded banking information recorded thereon. The debit/credit card may be a healthcare savings account debit card, typically issued by the plan third party administrator who sets up all of the subscriber accounts and interfaces with the plan sponsor regarding funds. The POS system reads the card information, item 53, and, by inspecting the card's BIN, or bank identification number, determines in decision item 53 whether the transaction is one where items may be payable using the subscriber's FSA. Currently, for example, the first nine digits of the BIN number (called the extended BIN) are unique and are linked to a specific FSA plan for subscribers.

At this point in the transaction process for a normal purchase (i.e., a purchase not linked to an FSA), the POS system uses the standard financial card network to process the transaction, item 54. The system verifies that an account has enough money to cover the expense and authorizes or refuses the transaction based on this decision. However, when the POS system recognizes the digits of the extended BIN (depending upon the BIN structure) as a BIN associated with a healthcare spending account card, in item 55, the POS system determines which of the item UPCs are eligible for payment using an FSA based on the merchant's list of eligible FSA items, as discussed hereinabove. This list may be broader than the list of authorized items that a given plan sponsor/employer permits, and therefore a second more limited search of eligible items known to the transaction processor's system is required.

Next, in item 56, the merchant sends the UPCs of the individual eligible items in the transaction, along with their costs and the card number (which includes the BIN number) to a designated transaction processor using a data transmission line, for example second data communications network line 44. The transaction processor receives the UPCs and their associated costs and, in item 57, compares each against a list of healthcare spending account authorized items as defined by the subscriber's plan sponsor.

The method flow is shown in items 58-61. In decision item 58, the transaction processor checks to see if the transaction contains prescription UPC items. The flow moves to items 62/63 for non prescription UPC items, as explained later. If there is a prescription UPC item, for any prescription UPC items, the flow moves to decision item 59, where the transaction processor checks to see if the prescription UPC cost amount(s) match the PBM authorization amount(s) or combination. If the amounts do not match, under item 60, the pharmacy UPCs are not authorized for payment using the healthcare spending account. If the amounts do match, under item 61, the pharmacy UPCs are authorized for payment, and the flow moves to items 62/63, as once the comparisons are complete, the transaction processor has a list of UPCs and their respective costs that are eligible and authorized for payment from the healthcare spending account, as well as a list of those eligible items that are not authorized. In item 62, the transaction processor sends a response with approved UPCs and their amounts to the merchant's POS system. The transaction processor, in item 63, also stores a record of the transaction and approved amount in a database for future validation. The approved amount is a range from the total of all approved items to the same total plus the total tax of the transaction. This information is stored for a time period, for example, for up to two minutes, for substantiating card swipes from the financial network and is cleared immediately after the storage time period expires.

The transaction processor also preferably stores permanently, for example in third data structure 36, the following information for each transaction, and additionally transmits this information back to the insurer and/or administrator for further use and tabulation;
  Subscriber identification number,
  Card account number,
  Department number of each UPC,
  All authorized and unauthorized UPC items,
  Dollar amounts of each item,
  Merchant identification number,
  Approved amount with tax,
  Date and time of transaction, and
  Transaction identification number.

The merchant's POS system then receives the approved UPCs and the approved amount sent in item 62 and calculates the split transaction if necessary in item 64. The POS system next transmits the sum of the costs for the authorized items plus the newly calculated tax to produce a payment total back to the transaction processor using the financial card network for payment/approval in item 65. In item 66, the transaction processor completes the standard authorization checks (ie., whether enough funds exist in the account, eligibility, PIN number etc.) and whether a matching pre-authorized amount (from the steps above) from the same merchant is in the database, and whether the amount is within the approved amount range to substantiate the card transaction. Transactions conducted in this fashion are substantiated based on the fact that the transaction amount is within the stored range and that the transaction is substantiated within the time period discussed above.

The transaction processor, in item 67, also has to determine if the account has an available balance at least equal to the pre-authorized amount. Decision item 68 tests to see if the transaction is approved. If the transaction meets the two criteria discussed above, adequate available funds and finding the approved amount from the same merchant, the transaction is approved and, in item 69, an approval amount is transmitted to the merchant's POS system through the financial network and funds are disbursed as normal. If the transaction does not meet both criteria, then the transaction processor transmits a declined message, and, in item 72, the cashier then requests an alternative form of payment from the customer. Then, in item 73, the merchant uses traditional payment systems to process the non-approved transaction.

Decision item 70 determines if the customer has a remaining balance after payment for authorized items using the healthcare spending account in item 69. If the approved transaction amount covers the entire transaction, then, in item 71, the transaction is complete. If the approved transaction amount does not cover the entire transaction cost, then, in item 72, the cashier is prompted by the POS system to request a second form of payment from the subscriber. For example, the amount of funds in the available balance in the healthcare spending account may not completely cover the cost of the healthcare spending account eligible and authorized items to be purchased. In this situation, the funds from the healthcare spending account are used to cover as much of the transaction as possible, whereupon the transaction processor or merchant calculates the deficit and requests in item 72 a separate form of payment from the customer for the remaining amount.

Finally, if no items included in the transaction are healthcare spending account eligible, then the transaction processor declines the transaction by transmitting a "declined" message to the POS system. The merchant may then request the customer to provide an alternative form of payment, in item 72. In these situations where a second form of payment is requested from the customer, in item 73, the merchant uses traditional systems to process the transaction. For example, the customer could present cash, check, or other debit/credit card to complete payment for the transaction.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A system for providing real-time access to funds available in at least one healthcare spending account using a point of sale system supporting real-time transactions, the point of sale system including a first input device capable of recognizing items presented for purchase and a second input device capable of recognizing a healthcare spending account device identifying the at least one healthcare spending account, the system comprising:
  a processor system capable of receiving inputs from and providing outputs to the point of sale system;
  a transaction processor system capable of communicating with the processor system, the transaction processor system including a processor and a memory, the memory including
  a first data structure configured to contain eligible item identifiers for items that are eligible for purchase using the least one healthcare spending account and including an indicator for each item of whether the item is eligible for purchase using the least one healthcare spending account;
  a second data structure configured to contain authorized item identifiers for items that are authorized for purchase using the at least one healthcare spending account;
  a third data structure configured to contain transaction data detail; and
  a decision system using the eligible item identifiers contained in the first data structure, the authorized item identifiers contained in the second data structure, and the transaction data detail contained in the third data structure to process transactions and provide transaction information to the point of sale system.

2. A system in accordance with claim 1, wherein the processor system further includes the point of sale system.

3. A system in accordance with claim 1, wherein said inputs comprise universal product code scanning device data.

4. A system in accordance with claim 1, wherein said inputs from the point of sale system comprise card reader data.

5. A system in accordance with claim 1, wherein said healthcare spending account device is a debit card.

6. A system in accordance with claim 1, wherein wireless network interface technology is employed by the system.

7. A system in accordance with claim 6, wherein said wireless network interface technology is configured to communicate via WiFi or IEEE 802.11 standards.

8. A system in accordance with claim 1, wherein data encryption technology is employed by the system.

9. A method for real-time access to funds available in at least one healthcare spending account, comprising the following steps:
   a. authorizing merchant categories for healthcare spending account reimbursement;
   b. classifying items by their eligibility for reimbursement by the merchant, as indicated by an indicator of eligibility, and identifying merchant categories for each said item;
   c. receiving data from a merchant point of sale (POS) system at which a customer has presented items for purchase;
   d. receiving data from a merchant POS system processing a healthcare spending account device identifying at least one healthcare spending account;
   e. recognizing the eligible healthcare spending account items;
   f. sending healthcare spending account item transaction data to a decision system;
   g. substantiating at the decision system which eligible healthcare spending account items are authorized;
   h. determining if the at least one healthcare spending account identified by the healthcare spending account device has an available balance;
   i. sending a response record with a preauthorized transaction amount from the decision system to the merchant for financial processing, the transaction amount not to exceed the available balance for the at least one healthcare spending account;
   j. sending a transaction request that is based on the decision system response record through a financial card network to the transaction processor by the merchant;
   k. authorizing, in real-time, healthcare spending account amounts by the transaction processor for the preauthorized transaction amount from the response record;
   l. calculating any balance due in excess of the authorized healthcare spending account amounts for the items presented; and
   m. requesting payment of any balance due by the merchant.

10. A method in accordance with claim 9, wherein the at least one healthcare spending account includes a flexible spending account.

11. A method in accordance with claim 9, wherein the at least one healthcare spending account includes a health reimbursement arrangement.

12. A method in accordance with claim 9, wherein the step of authorizing merchant categories is provided by one of a plan sponsor, an insurance company, or another applicable party, other than the merchant.

13. A method in accordance with claim 9, wherein the items are recognized by universal product codes.

14. A method in accordance with claim 9, wherein the healthcare spending account device is a debit card.

15. A method in accordance with claim 9, wherein the decision system is located at the transaction processor.

16. A method in accordance with claim 9, where items comprise any of co-payment costs, product costs, service costs, and pharmacy refill costs.

17. A method in accordance with claim 9, where non-medical items can be purchased, but not reimbursed, in addition to the medical items.

* * * * *